US010242022B1

(12) United States Patent
Jain et al.

(10) Patent No.: US 10,242,022 B1
(45) Date of Patent: Mar. 26, 2019

(54) SYSTEMS AND METHODS FOR MANAGING DELAYED ALLOCATION ON CLUSTERED FILE SYSTEMS

(71) Applicant: Veritas Technologies LLC, Mountain View, CA (US)

(72) Inventors: Sanjay Jain, Pune (IN); Shirish Vijayvargiya, Pune (IN); Anindya Banerjee, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 266 days.

(21) Appl. No.: 15/233,849

(22) Filed: Aug. 10, 2016

(51) Int. Cl.
*G06F 17/30* (2006.01)

(52) U.S. Cl.
CPC .. *G06F 17/30171* (2013.01); *G06F 17/30197* (2013.01); *G06F 17/30362* (2013.01); *G06F 17/30424* (2013.01)

(58) Field of Classification Search
CPC ......... G06F 17/30171; G06F 17/30362; G06F 17/30197; G06F 17/30424
USPC ........................................................ 707/704
See application file for complete search history.

(56) References Cited

U.S. PATENT DOCUMENTS

| 5,285,528 | A | * | 2/1994 | Hart | ........................... | G06F 9/52 |
| | | | | | | 711/152 |
| 5,440,732 | A | * | 8/1995 | Lomet | ............... | G06F 17/30362 |
| | | | | | | 707/999.008 |
| 5,485,607 | A | * | 1/1996 | Lomet | ............... | G06F 17/30362 |
| | | | | | | 707/999.008 |
| 5,956,712 | A | * | 9/1999 | Bennett | ............. | G06F 17/30171 |
| | | | | | | 707/999.008 |
| 6,665,738 | B2 | * | 12/2003 | Vishlitzky | ............. | G06F 3/0611 |
| | | | | | | 710/4 |

* cited by examiner

*Primary Examiner* — Vincent F Boccio
(74) *Attorney, Agent, or Firm* — FisherBroyles, LLP

(57) ABSTRACT

The disclosed computer-implemented method for managing delayed allocation on clustered file systems may include (i) receiving, at a global lock manager that stores storage disk allocation information for a plurality of nodes in a clustered file system, a lock request from a node that requests a lock range on a storage disk to store data from a file, (ii) reserving, by the global lock manager, the lock range, (iii) receiving, at the global lock manager, from an additional node, an additional lock request for an additional lock range to store additional data from the file, and (iv) reserving, by the global lock manager, the additional lock range to be adjacent to the lock range on the storage disk based on the additional data on the additional node being from the same file as the data on the node. Various other methods, systems, and computer-readable media are also disclosed.

20 Claims, 5 Drawing Sheets

SYSTEMS AND METHODS FOR MANAGING DELAYED ALLOCATION ON CLUSTERED FILE SYSTEMS

BACKGROUND

Delayed allocation is a memory management practice that generally splits disk block allocation into two stages. In the first stage, disk space on a storage disk may be reserved for the file data, and the write system call may be returned immediately after copying the data into a cache but before actually writing the data to the storage disk. In the second stage, disk blocks on the storage disk may be allocated to the file when the data is flushed from the cache. The block allocation is usually done by a background thread or scheduler. With this approach, the file system performs a group of extent allocations by combining multiple block allocation requests, potentially reducing file system fragmentation. Fast-moving temporary files, however, often do not have blocks allocated and thus do not add to the file system's fragmentation; by the time the fast-moving files would need allocation, the files have already been removed.

Delayed allocation may solve fragmentation problems on a single storage disk caused by multiple concurrent writers working on multiple files. But in a clustered environment, where multiple nodes are performing write operations, there is a possibility that files may become fragmented even if each node individually delays the block allocation for the writes happening on the node. The instant disclosure, therefore, identifies and addresses a need for systems and methods for managing delayed allocation on clustered file systems.

SUMMARY

As will be described in greater detail below, the instant disclosure describes various systems and methods for managing delayed allocation on clustered file systems by using a global lock manager to manage delayed allocation across multiple nodes.

In one example, a computer-implemented method for managing delayed allocation on clustered file systems may include (i) receiving, at a global lock manager that stores, within a lock range data structure, storage disk allocation information for a group of nodes in a clustered file system, a lock request from a node that requests a lock range on a storage disk to store data from a file, (ii) reserving, by the global lock manager, in the lock range data structure, the lock range on the storage disk for the data from the file in response to the lock request from the node, (iii) receiving, at the global lock manager, from an additional node within the nodes in the clustered file system, an additional lock request for an additional lock range on the storage disk to store additional data from the file, and (iv) reserving, by the global lock manager, in the lock range data structure, the additional lock range to be adjacent to the lock range on the storage disk based on the additional data on the additional node being from the same file as the data on the node.

In one embodiment, the computer-implemented method may further include receiving, by the global lock manager, from the node, a query about the lock range for the data from the file and sending, by the global lock manager, to the node, information about the lock range. In some examples, the computer-implemented method may further include filling a section of the storage disk defined by the additional lock range with filler data in response to receiving the query about the lock range. Additionally or alternatively, the computer-implemented method may further include sending, to the additional node, in response to receiving the query about the lock range, a message indicating that the additional node should write the additional data to a section of the storage disk defined by the additional lock range.

In some embodiments, the computer-implemented method may further include (i) receiving, at the node, a write request that includes the data from the file, (ii) storing, at the node, the data from the file in a buffer, (iii) requesting, by the node, the lock range from the global lock manager, (iv) determining, by the node, that the buffer needs to be cleared, (v) querying, by the node, the global lock manager about the lock range, (vi) receiving, by the node, information about the lock range from the global lock manager, and (vii) writing, by the node, the data from the file to a section of the storage disk defined by the lock range. In one embodiment, the computer-implemented method may further include (i) storing, by the additional node, the additional data from the file in a buffer, (ii) receiving, by the additional node, a message indicating that the additional node should write the additional data to a section of the storage disk defined by the additional lock range, and (iii) writing, by the additional node, the additional data to the section of the storage disk defined by the additional lock range in response to the message despite having not determined, by the additional node, that the buffer needs to be cleared.

In one embodiment, the computer-implemented method may further include (i) determining, at a quota management node, a delayed allocation quota for each individual node in the nodes, where the delayed allocation quota includes a total amount of memory available to be claimed by the individual node via lock ranges reserved by the individual node with the global lock manager, (ii) determining, at the quota management node, that the node has met a delayed allocation quota for the node, and (iii) disallowing, by the quota management node, the node from receiving additional lock ranges from the global lock manager. In some examples, the computer-implemented method may further include determining, by the quota management node, that the node has written data to a previously requested lock range and allowing, by the quota management node, the node to receive the additional lock ranges.

In one embodiment, a system for implementing the above-described method may include a receiving module, stored in memory, that receives, at a global lock manager that stores, within a lock range data structure, storage disk allocation information for a group of nodes in a clustered file system, a lock request from a node that requests a lock range on a storage disk to store data from a file and a reservation module, stored in memory, that reserves, by the global lock manager, in the lock range data structure, the lock range on the storage disk for the data from the file in response to the lock request from the node. In some embodiments, the receiving module may receive, at the global lock manager, from an additional node within the nodes in the clustered file system, an additional lock request for an additional lock range on the storage disk to store additional data from the file and the reservation module may reserve, by the global lock manager, in the lock range data structure, the additional lock range to be adjacent to the lock range on the storage disk based on the additional data on the additional node being from the same file as the data on the node. The system for implementing the above-described method may also include at least one physical processor configured to execute the receiving module and the reservation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at a global lock manager that stores, within a lock range data structure, storage disk allocation information for a group of nodes in a clustered file system, a lock request from a node that requests a lock range on a storage disk to store data from a file, (ii) reserve, by the global lock manager, in the lock range data structure, the lock range on the storage disk for the data from the file in response to the lock request from the node, (iii) receive, at the global lock manager, from an additional node within the nodes in the clustered file system, an additional lock request for an additional lock range on the storage disk to store additional data from the file, and (iv) reserve, by the global lock manager, in the lock range data structure, the additional lock range to be adjacent to the lock range on the storage disk based on the additional data on the additional node being from the same file as the data on the node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
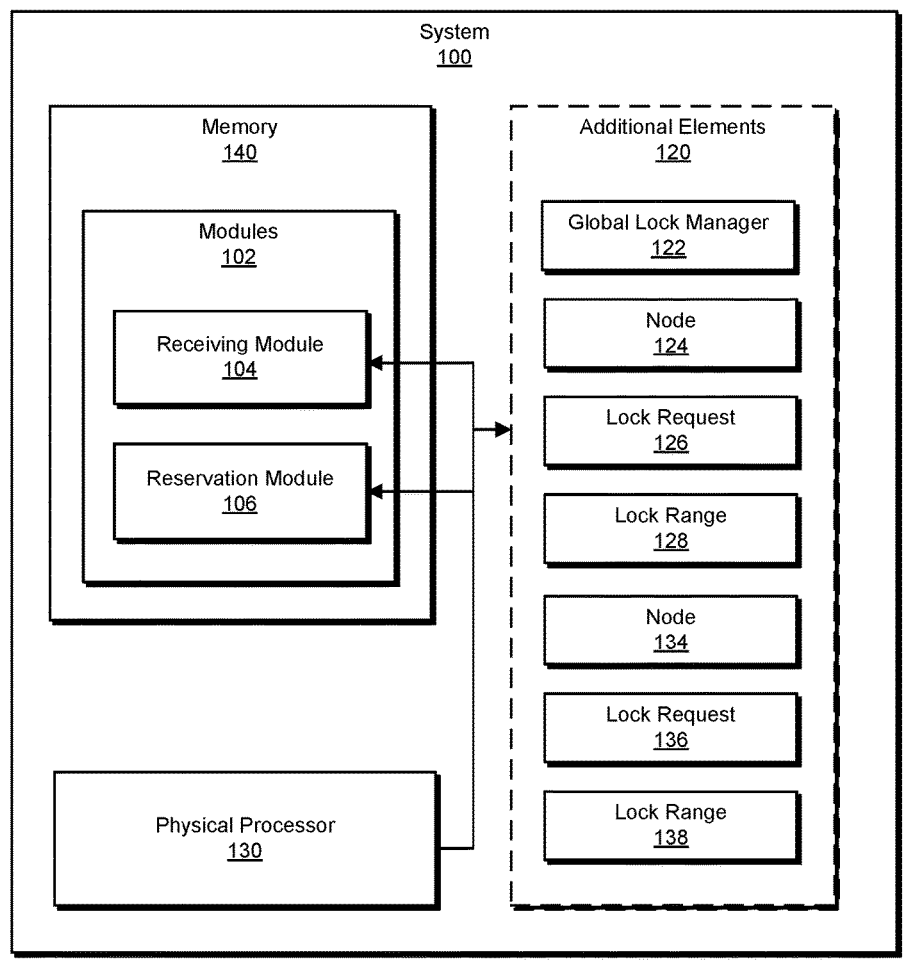
FIG. 1 is a block diagram of an example system for managing delayed allocation on clustered file systems.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing delayed allocation on clustered file systems. As will be explained in greater detail below, by using a global lock manager to reserve lock ranges for a set of nodes in a clustered file system, the systems and methods described herein may decrease the disk fragmentation that would otherwise be caused by different nodes writing portions of the same file at different times and to different locations. Moreover, the systems and methods described herein may improve the functioning of a clustered file system hosted on one or more servers and using one or more storage disks by improving the efficiency of memory allocation on the storage disks.

Figure 2:
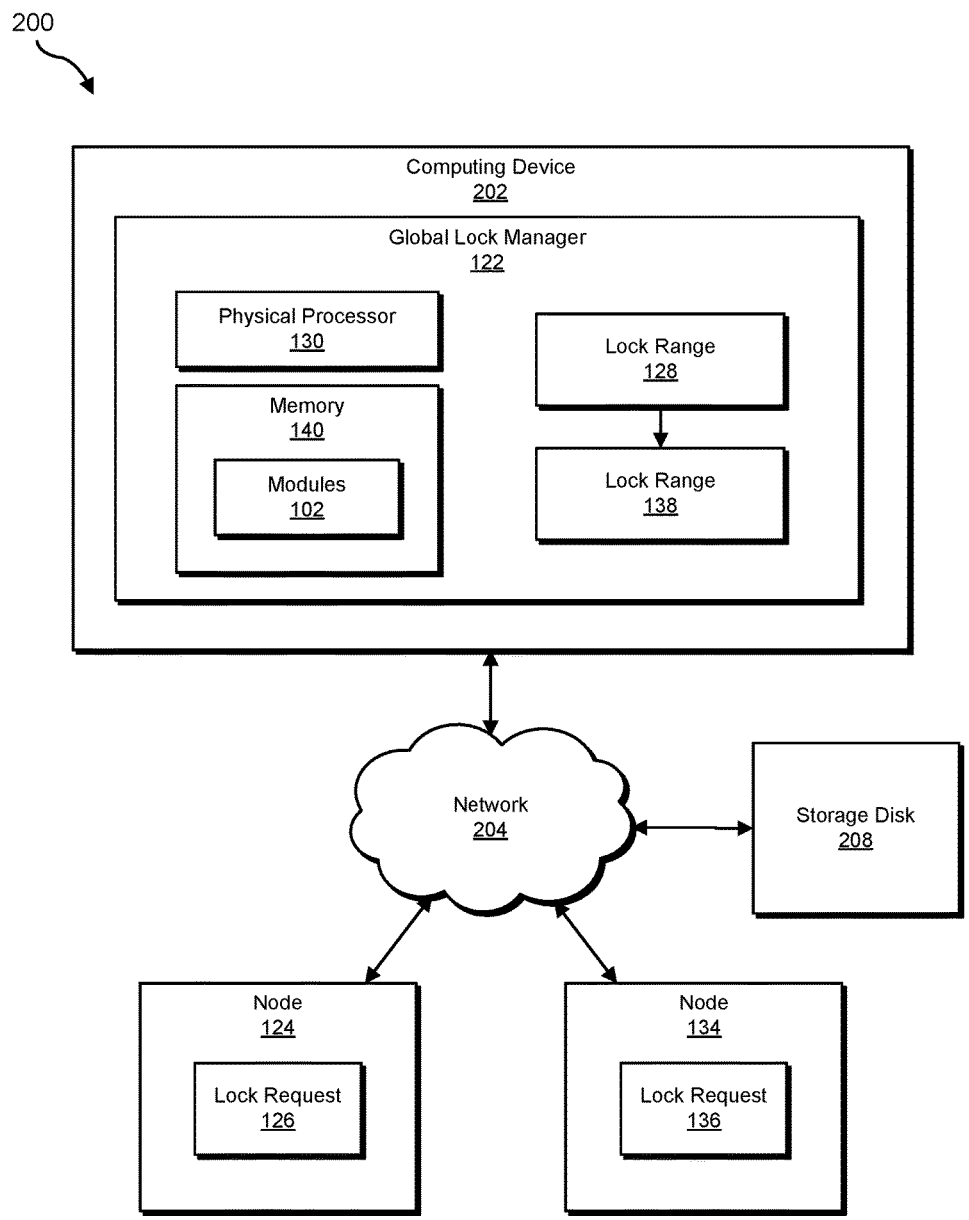
FIG. 2 is a block diagram of an additional example system for managing delayed allocation on clustered file systems.
Figure 3:
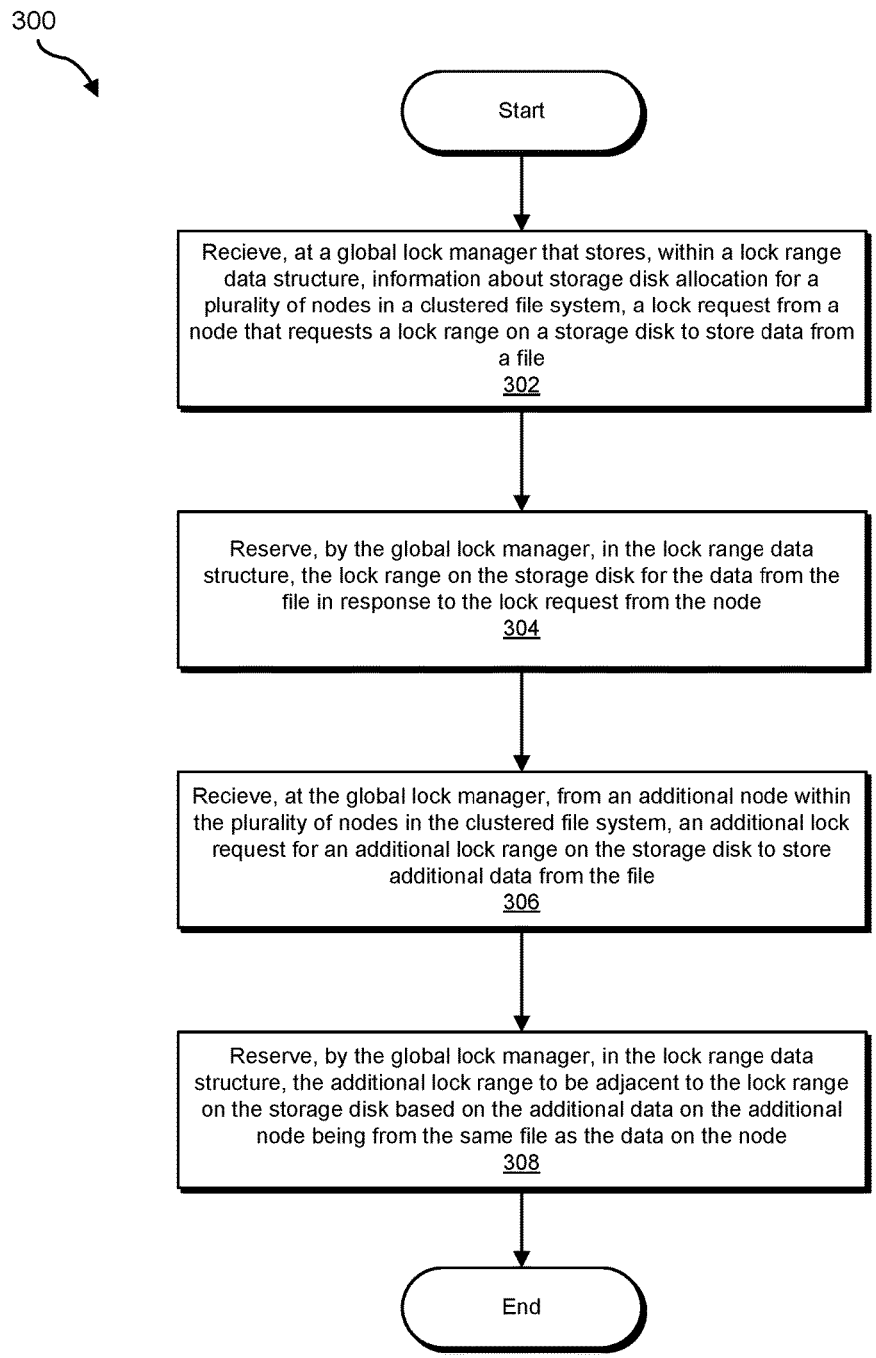
FIG. 3 is a flow diagram of an example method for managing delayed allocation on clustered file systems.
Figure 4:
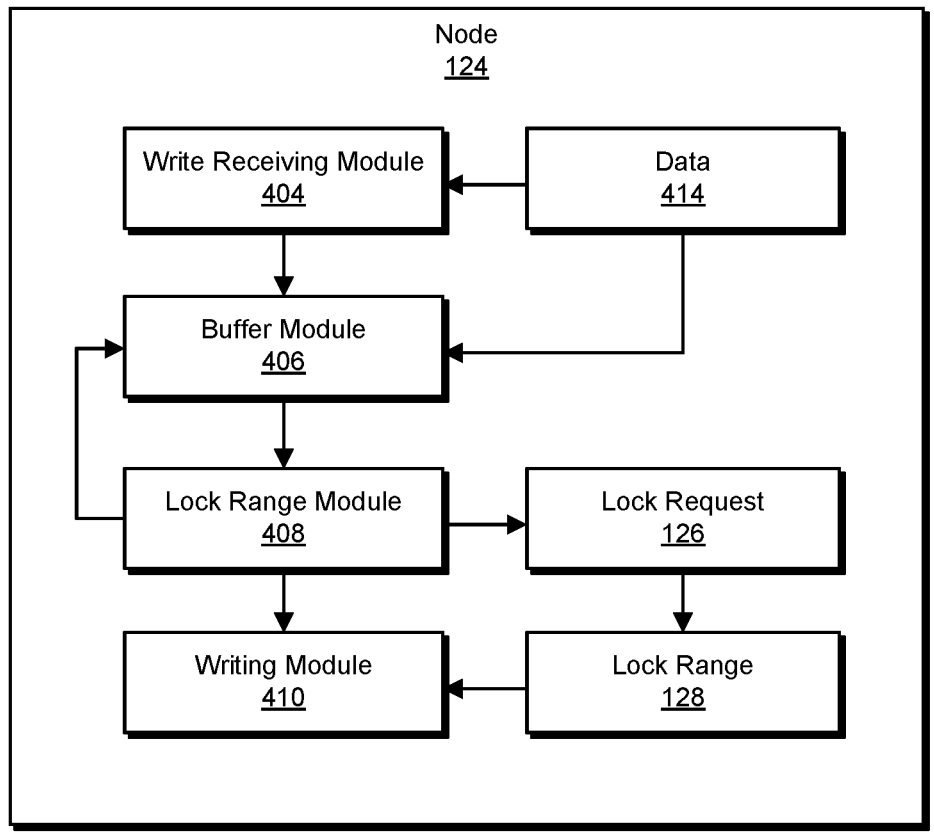
FIG. 4 is a block diagram of an example system for managing delayed allocation on clustered file systems.

The following will provide, with reference to FIGS. 1, 2, and 4, detailed descriptions of example systems for managing delayed allocation on clustered file systems. Detailed descriptions of corresponding computer-implemented methods will also be provided in connection with FIGS. 3 and 5.

FIG. 1 is a block diagram of an example system 100 for managing delayed allocation on clustered file systems. As illustrated in this figure, example system 100 may include one or more modules 102 for performing one or more tasks. For example, and as will be explained in greater detail below, example system 100 may include a receiving module 104 that receives, at a global lock manager that stores, within a lock range storage structure, storage disk allocation information for a plurality of nodes in a clustered file system, a lock request from a node that requests a lock range on a storage disk to store data from a file. Example system 100 may additionally include a reservation module 106 that reserves, by the global lock manager, in the lock range data structure, the lock range on the storage disk for the data from the file in response to the lock request from the node.

Receiving module 104 may further receive, at the global lock manager, from an additional node within the plurality of nodes in the clustered file system, an additional lock request for an additional lock range on the storage disk to store additional data from the file. Reservation module 106 may further reserve, by the global lock manager, in the lock range data structure, the additional lock range to be adjacent to the lock range on the storage disk based on the additional data on the additional node being from the same file as the data on the node. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing delayed allocation on clustered file systems. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120. Global lock manager 122 generally represents any type or form of module, script, application, and/or software component that is capable of reserving lock ranges related to available storage on one or more storage disks. In some embodiments, global lock manager 122 may store information about lock ranges in a lock range data structure. For example, global lock manager 122 may store, in the lock range data structure, metadata about data that is to be stored in each reserved lock range. A lock range data structure may represent any suitable data structure for storing information relating to lock ranges, such as one or more variables in memory, files, list, arrays, heaps, and/or objects. In addition, node 124 and/or node 134 generally represent any type or form of physical and/or virtual computing device that is capable of performing write operations. In some embodiments, node 124 and/or node 134 may include a buffer that temporarily stores file data from write operations before the data is written to a storage disk.

Lock request 126 and/or lock request 136 generally represent any type or form of communication from a node to a global lock manager requesting a lock range for data to be written to a storage disk. For example, a lock request may be a request for a lock range of a specified size to write a portion of data from a file. In addition, lock range 128 and/or lock range 138 generally represent any type or form of data that defines a specified segment of memory on one or more storage disks. For example, a lock range may include a starting location and an ending location in memory on a storage disk. In some embodiments, a lock range may exclusively reserve a section of memory; that is, any particular section of memory on a storage disk may be described by only one lock range at a time. In one embodiment, a lock range may be a disk block allocation range that includes references to the locations of one or more blocks of memory on a disk.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with node 124, node 134, and/or a storage disk 208 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to manage delayed allocation on clustered file systems.

Computing device 202 generally represents any type or form of computing device capable of reading computer-executable instructions. In some embodiments, computing device 202 may be a remote (i.e., cloud) server in a data center. Additional examples of computing device 202 include, without limitation, storage servers, database servers, application servers, and/or web servers configured to run certain software applications and/or provide various storage, database, and/or web services. Although illustrated as a single entity in FIG. 2, computing device 202 may include and/or represent a plurality of servers that work and/or operate in conjunction with one another.

Network 204 generally represents any medium or architecture capable of facilitating communication or data transfer. In one example, network 204 may facilitate communication between computing device 202, node 124, node 134, and/or storage disk 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Storage disk 208 generally represents any type or form of physical or virtual computing storage media. Examples of storage disk 208 may include, without limitation, any or all of the types of memory discussed in conjunction with memory 140 above.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for managing delayed allocation on clustered file systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, at a global lock manager that stores, within a lock range data structure, storage disk allocation information for a plurality of nodes in a clustered file system, a lock request from a node that requests a lock range on a storage disk to store data from a file. For example, receiving module 104 may, as part of computing device 202 in FIG. 2, receive, at global lock manager 122 that stores storage disk allocation information for a plurality of nodes in a clustered file system, lock request 126 from node 124 that requests lock range 128 on storage disk 208 to store data from a file.

The term "clustered file system," as used herein, generally refers to any type of shared file system hosted on one or more servers. In some embodiments, a clustered file system may include multiple nodes that process write requests to one or more storage disks. In some embodiments, all nodes within the clustered file system may write data to the same storage disk or collection of storage disks.

Receiving module 104 may receive a lock request in a variety of contexts. For example, receiving module 104 may be part of a global lock manager and may receive lock requests from all of the nodes in a clustered file system. In one example, receiving module 104 may receive a lock request from a node that has just received a write request from an application and/or process.

At step 304, one or more of the systems described herein may reserve, by the global lock manager, in the lock range data structure, the lock range on the storage disk for the data from the file in response to the lock request from the node. For example, reservation module 106 may, as part of computing device 202 in FIG. 2, reserve, by global lock manager 122, lock range 128 on storage disk 208 for the data from the file in response to lock request 126 from node 124.

Reservation module 106 may reserve the lock range in a variety of ways. For example, reservation module 106 may determine that a section of memory on the storage is of the appropriate size for the data and is not already full of data and may reserve that section of memory on the storage disk as the lock range. In some embodiments, reservation module 106 may, as part of a global lock manager, store information about the reserved lock range and/or the data to be stored in the lock range. For example, the global lock manager may store the lock range and/or metadata about the data in a predetermined data structure that may be queried by nodes and/or other processes. In some embodiments, reservation module 106 may later allocate the lock range by using a file system background thread, flusher daemon, and/or scheduler to allocate the lock range based on the information stored by the global lock manager about the reserved lock range.

At step 306, one or more of the systems described herein may receive, at the global lock manager, from an additional node within the plurality of nodes in the clustered file system, an additional lock request for an additional lock range on the storage disk to store additional data from the file. For example, receiving module 104 may, as part of computing device 202 in FIG. 2, receive, at global lock manager 122, from node 134 within the plurality of nodes in the clustered file system, lock request 136 for lock range 138 on storage disk 208 to store additional data from the file.

Receiving module 104 may receive the additional lock request in a variety of ways. For example, receiving module 104 may receive the additional lock request immediately subsequent to receiving the first lock request. In other examples, receiving module 104 may receive any number of lock requests for data from other files in between the first lock request and the additional lock request for data from the same file.

At step 308, one or more of the systems described herein may reserve, by the global lock manager, in the lock range data structure, the additional lock range to be adjacent to the lock range on the storage disk based on the additional data on the additional node being from the same file as the data on the node. For example, reservation module 106 may, as part of computing device 202 in FIG. 2, reserve, by global lock manager 122, additional lock range 138 to be adjacent to lock range 128 on storage disk 208 based on the additional data on additional node 134 being from the same file as the data on node 124.

The term "adjacent," as used herein, generally refers to any situation where combining a lock range with an adjacent lock range would result in one contiguous lock range. For example, a second lock range that is adjacent to a first lock range may start at the same memory address where the first lock range ends. In another example, the second lock range may end at the same memory address where the first lock range starts.

Reservation module 106 may reserve the additional lock range in a variety of ways. For example, reservation module 106 may, as part of a global lock manager, compare information about the additional lock request with information about the first lock request and determine that both lock requests are for data from the same file.

In one embodiment, the global lock manager may receive, from the node, a query about the lock range for the data from the file and may send, to the node, information about the lock range. The global lock manager may receive the query about the lock range at any time after reserving the lock range.

In some embodiments, some or all of the systems and methods described herein may also be performed on a node. For example, as illustrated in FIG. 4, node 124 may include a write receiving module 404 that receives a write request that includes data 414 from a file. Node 124 may also include a buffer module 406 that stores data 414 and later determines that the buffer needs to be cleared (e.g., because the buffer is full). Additionally, node 124 may include a lock range module 408 that sends lock request 126 to the global lock manager and later, when buffer module 406 has determined that it is time to clear the buffer, queries the global lock manager about lock range 128 and receives information about lock range 128 from the global lock manager. Node 124 may also include a writing module 410 that writes data 414 from the file to a section of the storage disk defined by lock range 128. In some embodiments, the additional node may also include any or all of the aforementioned modules.

In some embodiments, the systems described herein may fill the additional range with data in response to determining that the node has written to and/or is about to write to the lock range. In some examples, the systems described herein may fill a section of the storage disk defined by the additional lock range with filler data in response to receiving the query about the lock range. For example, the systems described herein may fill the additional lock range with the numeral "0." In some embodiments, the global lock manager may fill the additional lock range with filler data. In other embodiments, the global lock range may signal another node to fill the additional lock range with filler data.

Additionally or alternatively, the systems described herein may send, to the additional node, in response to receiving the query about the lock range, a message indicating that the additional node should write the additional data to a section of the storage disk defined by the additional lock range. In one embodiment, the global lock manager may send the message to the additional node. In some examples, the additional node may write data to the additional lock range before the original node does. In these examples, the systems described herein may fill the original lock range with filler data and/or trigger the original node to write the data from the file to the lock range.

In some embodiments, the systems described herein may perform some or all of the aforementioned steps on the additional node. For example, the additional node may store the additional data from the file in a buffer, receive a message indicating that the additional node should write the additional data to a section of the storage disk defined by the additional lock range, and write the additional data to the section of the storage disk defined by the additional lock range in response to the message, despite having not determined that the buffer needs to be cleared. In some embodiments, the additional node may then write the rest of the data from the buffer and clear the buffer. In other embodiments, the additional node may only write the data from the file.

Figure 5:
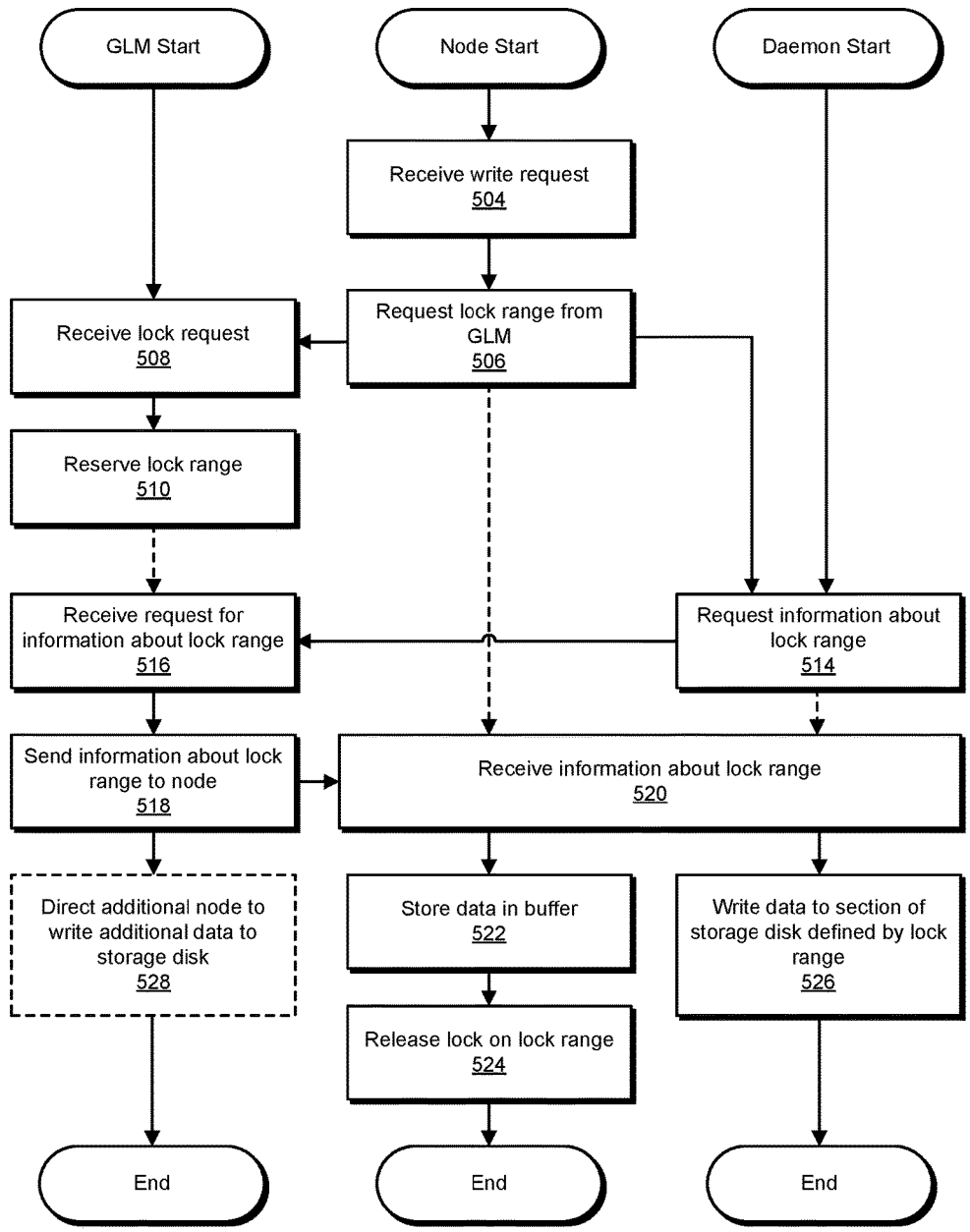
FIG. 5 is a flow diagram of an additional example method for managing delayed allocation on clustered file systems.

In some embodiments, a global lock manager, node, and/or flusher daemon may work in tandem. For example, as illustrated in FIG. 5, at step 504 a node may receive a write request. In some examples, the write request may come from an application, process, and/or script and may include file data to be written. At step 506, the node may request a lock range from the global lock manager in order to have a section of memory reserved for when it is time to write the file data from the write request. At step 508, the global lock manager may receive the lock request from the node. At step 510, the global lock manager may then reserve the requested lock range for the data from the file currently stored on the node. In some embodiments, the global lock manager may immediately inform the node of the lock range. In other embodiments, the global lock manager may not immediately inform the node and/or may store data about the lock range and/or the file.

At some point before or after step 514, the node may detect that the buffer is full. In some embodiments, detecting that the buffer is full may trigger the node to write all of the data in the buffer. In other embodiments, other cues may trigger the node to write the data from the file (e.g., at predetermined intervals and/or due to messages from other processes). At step 514, the daemon may request information about the lock range in order to determine where on the storage disk to write the data from the file. At step 516, the global lock manager may receive the request for information about the lock range and at step 518, the global lock manager may send the information about the lock range to the node. At step 520, the daemon and/or the node may receive the information about the global lock range. At step 522, the node may store the data in a buffer on the node. The buffer may be any sort of data structure that is capable of temporarily storing file data. Later, at step 524, when it is time for the data to be written, the node may release the lock on the lock range. In some embodiments, the node may send a message to the global lock manager about releasing the lock. At step 526, the daemon may write the data to the section of the storage disk defined by the lock range. In some examples, the daemon may write the data to the storage disk after the node determines that the buffer is full and/or flushes the buffer. In some embodiments, at step 528, the global lock manager may direct the additional node to write the additional data from the file to the storage disk in response to having received the request for the lock range from the node. In other embodiments, the node may query the global lock manager to determine if any other nodes have lock ranges for data from the file and then the node may direct the other nodes to write the data from the file to the storage disk.

In some embodiments, the systems described herein may use a quota system to ensure that no node ever has too large a quantity of data stored in its buffer at one time, reducing the possible damage caused by a node failing and losing any data stored in the buffer. In one embodiment, the systems described herein may determine, at a quota management node, a delayed allocation quota for each individual node in the plurality of nodes, where the delayed allocation quota is a total amount of memory available to be claimed by the individual node via lock ranges reserved by the individual node with the global lock manager. In this embodiment, the systems described herein may also determine, at the quota management node, that the node has met a delayed allocation quota for the node and disallow, by the quota management node, the node from receiving additional lock ranges from the global lock manager. For example, the quota management node may allocate a maximum of 5 megabytes (MB) of memory that each node is allowed to claim via lock ranges, preventing any node from storing more than 5 MB of data in the buffer for that node. In this example, once a node has stored 5 MB of data in the buffer, the node may write all of the data in the buffer to the storage disk. The quota management node may then allow the node to request additional lock ranges up to 5 MB. In some examples, a node may write part of the data in the buffer to the storage disk. For example, if a node has reached that node's quota for lock ranges and then writes 1 MB of data, the quota management node may allow the node to request up to another 1 MB worth of lock ranges.

As explained in connection with method 300 above, in order to avoid fragmentation because of scattered block allocation requests across multiple nodes in clustered file systems, the systems described herein may maintain cluster-wide information about disk allocation requests. The systems described herein may also use a global lock manager to maintain information about the file data and associated disk allocation. When a node receives a write request and requires disk allocation, then the node may make a lock request to the global lock manager, which may make a global lock range while in exclusion mode. The global lock manager may also store information about the area which needs disk allocation and, in some examples, may coalesce or split the lock range.

In some examples, if a node is writing to an unallocated area of a file, for which another node has already made request because of previous write in the area, then the systems described herein may discard the file data on the other node due to the overlapping range. This may allow the systems described herein to delay disk allocation even further and also reduce number of writes to persistent storage. In cases of file truncation, the systems described herein may clear the delayed allocation range outside truncated size for delayed allocation. In sum, the systems described herein may enable clustered file systems to avoid scattered allocations in the cluster, making input/output more efficient, as well as avoiding small allocations in the cluster by combining scattered allocation requests, preventing file system fragmentation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing delayed allocation on clustered file systems, at least a portion of the method being performed by a computing device comprising at least one processor, the method comprising:

receiving, at a global lock manager that stores, within a lock range data structure, storage disk allocation information for a plurality of nodes in a clustered file system, a lock request from a node that requests a lock range on a storage disk to store data from a file;

reserving, by the global lock manager, in the lock range data structure, the lock range on the storage disk for the data from the file in response to the lock request from the node;

receiving, at the global lock manager, from an additional node within the plurality of nodes in the clustered file system, an additional lock request for an additional lock range on the storage disk to store additional data from the file;

reserving, by the global lock manager, in the lock range data structure, the additional lock range to be adjacent to the lock range on the storage disk based on the additional data on the additional node being from the same file as the data on the node;

determining, at a quota management node, a delayed allocation quota for each individual node in the plurality of nodes, wherein the delayed allocation quota comprises a total amount of memory in a buffer available to be claimed by the individual node via lock ranges reserved by the individual node with the global lock manager;

determining, at the quota management node, that the node has met a delayed allocation quota for the node; and disallowing, by the quota management node, the node from receiving additional lock ranges from the global lock manager until the node has written all of the data stored in the buffer for the node to the storage disk, wherein the data corresponds to the total amount of memory available in the buffer to be claimed by the node via the lock ranges.

2. The computer-implemented method of claim 1, further comprising:
receiving, by the global lock manager, from the node, a query about the lock range for the data from the file; and
sending, by the global lock manager, to the node, information about the lock range.

3. The computer-implemented method of claim 2, further comprising filling a section of the storage disk defined by the additional lock range with filler data in response to receiving the query about the lock range.

4. The computer-implemented method of claim 2, further comprising sending, to the additional node, in response to receiving the query about the lock range, a message indicating that the additional node should write the additional data to a section of the storage disk defined by the additional lock range.

5. The computer-implemented method of claim 1, further comprising:
receiving, at the node, a write request that comprises the data from the file;
storing, at the node, the data from the file in the buffer;
requesting, by the node, the lock range from the global lock manager;
determining, by the node, that the buffer needs to be cleared;
querying, by the node, the global lock manager about the lock range;
receiving, by the node, information about the lock range from the global lock manager; and
writing, by the node, the data from the file to a section of the storage disk defined by the lock range.

6. The computer-implemented method of claim 1, further comprising:
storing, by the additional node, the additional data from the file in the buffer;
receiving, by the additional node, a message indicating that the additional node should write the additional data to a section of the storage disk defined by the additional lock range; and
writing, by the additional node, the additional data to the section of the storage disk defined by the additional lock range in response to the message despite having not determined, by the additional node, that the buffer needs to be cleared.

7. The computer-implemented method of claim 1, further comprising:
determining, by the quota management node, that the node has written data to a previously requested lock range; and
allowing, by the quota management node, the node to receive the additional lock ranges.

8. The computer-implemented method of claim 1, wherein the additional lock range is adjacent to the lock range on the storage disk when the additional lock range starts at a same memory address where the lock range ends.

9. A system for managing delayed allocation on clustered file systems, the system comprising:
a receiving module, stored in memory, that receives, at a global lock manager that stores, within a lock range data structure, storage disk allocation information for a plurality of nodes in a clustered file system, a lock request from a node that requests a lock range on a storage disk to store data from a file;
a reservation module, stored in memory, that reserves, by the global lock manager, in the lock range data structure, the lock range on the storage disk for the data from the file in response to the lock request from the node, wherein:
the receiving module receives, at the global lock manager, from an additional node within the plurality of nodes in the clustered file system, an additional lock request for an additional lock range on the storage disk to store additional data from the file; and
the reservation module reserves, by the global lock manager, in the lock range data structure, the additional lock range to be adjacent to the lock range on the storage disk based on the additional data on the additional node being from the same file as the data on the node; and
a quota management module, stored in memory, that:
determines, at a quota management node, a delayed allocation quota for each individual node in the plurality of nodes, wherein the delayed allocation quota comprises a total amount of memory available in a buffer to be claimed by the individual node via lock ranges reserved by the individual node with the global lock manager;
determines, at the quota management node, that the node has met a delayed allocation quota for the node; and
disallows, by the quota management node, the node from receiving additional lock ranges from the global lock manager until the node has written all of the data stored in the buffer for the node to the storage disk, wherein the data corresponds to the total amount of memory available in the buffer to be claimed by the node via the lock ranges; and
at least one physical hardware processor configured to execute the receiving module, the reservation module, and the quota management module.

10. The system of claim 9, wherein:
the receiving module receives, by the global lock manager, from the node, a query about the lock range for the data from the file; and
the receiving module sends, by the global lock manager, to the node, information about the lock range.

11. The system of claim 10, wherein the reservation module fills a section of the storage disk defined by the additional lock range with filler data in response to receiving the query about the lock range.

12. The system of claim 10, wherein the receiving module sends, to the additional node, in response to receiving the query about the lock range, a message indicating that the additional node should write the additional data to a section of the storage disk defined by the additional lock range.

13. The system of claim 9, further comprising:
a write receiving module, stored in memory, that receives, at the node, a write request that comprises the data from the file;
a buffer module, stored in memory, that stores, at the node, the data from the file in the buffer;
a lock range module, stored in memory, that requests, by the node, the lock range from the global lock manager; wherein:
the buffer module determines, by the node, that the buffer needs to be cleared;
the lock range module:
queries, by the node, the global lock manager about the lock range; and receives, by the node, information about the lock range from the global lock manager; and a writing module, stored in memory, that writes, by the node, the data from the file to a section of the storage disk defined by the lock range.

14. The system of claim 9, further comprising:

a buffer module, stored in memory, that stores, by the additional node, the additional data from the file in the buffer;

a lock range module, stored in memory, that receives, by the additional node, a message indicating that the additional node should write the additional data to a section of the storage disk defined by the additional lock range; and a writing module, stored in memory, that writes, by the additional node, the additional data to the section of the storage disk defined by the additional lock range in response to the message despite having not determined, by the additional node, that the buffer needs to be cleared.

15. The system of claim 9, wherein the quota management module:

determines, by the quota management node, that the node has written data to a previously requested lock range; and allows, by the quota management node, the node to receive the additional lock ranges.

16. The system of claim 9, wherein the additional lock range is adjacent to the lock range on the storage disk when the additional lock range starts at a same memory address where the lock range ends.

17. A non-transitory computer-readable medium comprising one or more computer-readable instructions that, when executed by at least one processor of a computing device, cause the computing device to:

receive, at a global lock manager that stores, within a lock range data structure, storage disk allocation information for a plurality of nodes in a clustered file system, a lock request from a node that requests a lock range on a storage disk to store data from a file;

reserve, by the global lock manager, in the lock range data structure, the lock range on the storage disk for the data from the file in response to the lock request from the node;

receive, at the global lock manager, from an additional node within the plurality of nodes in the clustered file system, an additional lock request for an additional lock range on the storage disk to store additional data from the file;

reserve, by the global lock manager, in the lock range data structure, the additional lock range to be adjacent to the lock range on the storage disk based on the additional data on the additional node being from the same file as the data on the node;

determine, at a quota management node, a delayed allocation quota for each individual node in the plurality of nodes, wherein the delayed allocation quota comprises a total amount of memory in a buffer available to be claimed by the individual node via lock ranges reserved by the individual node with the global lock manager;

determine, at the quota management node, that the node has met a delayed allocation quota for the node; and disallow, by the quota management node, the node from receiving additional lock ranges from the global lock manager until the node has written all of the data stored in the buffer for the node to the storage disk, wherein the data corresponds to the total amount of memory available in the buffer to be claimed by the node via the lock ranges.

18. The non-transitory computer-readable medium of claim 17, wherein the one or more computer-readable instructions cause the computing device to:

receive, by the global lock manager, from the node, a query about the lock range for the data from the file; and send, by the global lock manager, to the node, information about the lock range.

19. The non-transitory computer-readable medium of claim 18, wherein the one or more computer-readable instructions cause the computing device to fill a section of the storage disk defined by the additional lock range with filler data in response to receiving the query about the lock range.

20. The non-transitory computer-readable medium of claim 18, wherein the one or more computer-readable instructions cause the computing device to send, to the additional node, in response to receiving the query about the lock range, a message indicating that the additional node should write the additional data to a section of the storage disk defined by the additional lock range.

* * * * *